United States Patent Office 3,380,981
Patented Apr. 30, 1968

3,380,981
OLEFIN POLYMERIZATION PROCESS AND CATALYST FOR USE THEREIN
Donald B. Miller and Gifford G. McClaflin, Ponca City, Okla., assignors to Continental Oil Company, Ponca City, Okla., a corporation of Delaware
No Drawing. Filed Oct. 21, 1963, Ser. No. 317,818
22 Claims. (Cl. 260—93.7)

This invention relates to a process for polymerizing certain olefinic materials, and to a new catalyst composition employed in such polymerization process. More particularly, the present invention relates to the polymerization of ethylenically unsaturated monomers to produce stereoregulated polymers, that is, polymers having a high isotactic content. In one of its preferred aspects, the invention relates to an improved method for polymerizing propene.

Polymerization processes by which ethylenically unsaturated monomers, such as ethylene, propene and styrene, are polymerized to form valuable polymers, such as polyethylene, polypropylene and polystyrene, are now well known and widely used. Efforts are, however, constantly going forward in the chemical industry to improve polymerization processes with respect to the yields obtained, the properties of the polymer product produced and the cost of the materials utilized in the process. One of the most important considerations in any polymerization process which is catalytically promoted is the cost, properties and effectiveness of the catalyst which is used. In the polymerization of ethylenically unsaturated monomers, and particularly, of propylene, coordination-type catalysts of the general type discovered and developed by G. Natta and Karl Ziegler, and commonly referred to as Ziegler-Natta catalysts, are widely used. In its most basic form, the Ziegler-Natta catalyst system includes an organo-metallic compound (usually an alkyl aluminum compound) and a transition metal halide (usually one of the titanium halides). Many modifications and improvements have been made with respect to the basic constitution of the Ziegler-Natta catalyst system, and many of these improved catalyst compositions have been effective in the attainment of the specific end for which they were developed. Thus, some of the Ziegler-Natta catalysts in use are effective to give a relatively high yield of polymer and/or are also effective to vary the molecular weight of the polymer produced. Some are of less volatility and are preferred for this reason. By modifying the catalyst system in other respects, it is known that other process variables, such as reaction time, required temperature or pressure and/or the properties of the polymer product, can be varied and controlled.

In the case of the polymerization of some ethylenically unsaturated monomers, and particularly in the case of the polymerization of propylene, the presently existing commercial usage of the polymer in many instances requires that the polymer be characterized by a high degree of isotaxy. This property of the polymer results from the stereoregularity of the repeating units of the polymer chain and is manifested by a more highly crystalline or less amorphous character in the polymer. When the basic Ziegler-Natta catalyst is utilized for polymerizing propylene, the degree of isotaxy which characterizes the polymer product as measured by the accepted criterion of solubility in boiling heptane, does not generally exceed about 65 percent. This low degree of isotaxy renders the polypropylene so produced unsuitable for the majority of present commercial requirements so that production of polypropylene employing the basic, two-component catalyst system has been necessarily limited. Other attempts to improve the isotaxy of polypropylene by incorporating various modifiers in the basic Ziegler-Natta catalyst system have resulted in some improvement in the isotaxy of the polymer produced, but have frequently resulted in a reduction in the rate of polymerization or the yield which is so severe as to render the employment of such catalyst systems of questionable feasibility.

It is an important object of the present invention to provide an improved procedure for polymerizing ethylenically unsaturated monomers, and to provide an improved catalyst for use in such process.

Another object of this invention is to provide an improved polymerization catalyst which is capable of forming polymers having a very high isotactic content.

An additional object of the present invention is to provide an improved catalyst system which is highly effective and relatively inexpensive when utilized in the process of the invention for polymerizing certain olefinic materials.

A more specific object of the invention is to provide an improved process for polymerizing propylene.

Another object of the invention is to provide a catalyst which may be employed in the process of polymerizing propylene so as to yield polypropylene having a higher degree of isotaxy than has previously been obtainable utilizing many of the catalysts heretofore proposed for the polymerization of propylene.

In addition to the foregoing described objects of the invention, additional objects and advantageous features of the invention will become apparent from the following detailed description of the invention.

Broadly, the catalyst composition which is employed in the process of the present invention comprises a titanium halide compound, an organo-aluminum compound and an oxygenated organic halide compound. In one aspect, the invention is directed to the novel catalyst composition constituted by the three compounds described, and to the method of preparing such composition, and in another aspect, the invention relates to the use of the novel catalyst composition in the polymerization of ethylenically unsaturated monomers.

The organo-aluminum compounds which are useful in the invention are represented by the formula

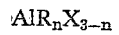
$AlR_nX_{3-n}$ wherein R is hydrocarbon, X is selected from hydrogen and halogen selected from the group consisting of chlorine, bromine and iodine, and $n$ varies from 2 to 3. Of these materials, those in which the hydrocarbon substituents of the aluminum are alkyl group are preferred. These preferred compounds within the scope of the structural formula above include, but are not limited to, triethylaluminum, triproplyaluminum, triisobutylaluminum, triamylaluminum, diethylaluminum hydride, dipropylaluminum hydride, diisobutylaluminum chloride, diamylaluminum hydride, diethylaluminum bromide and dipropylaluminum iodide. In addition to the various preferred types of alkyl sustituted aluminums mentioned, it will be apparent that the formula set forth above can include other aluminum compounds, such as the aryl halides and hydrides, as well as aluminum compounds fully substituted with other hydrocarbon groups. The hydrocarbon radicals in the aluminum compounds can be either like or unlike, and include the aromatic and saturated aliphatic radicals, as for example, alkyl, aryl, cycloalkyl, alkaryl and aralkyl. The hydrocarbon groups, alkyl or other types, are preferably limited to those containing from 1 to about 12 carbon atoms, and are most preferably the lower alkyl groups containing from about 2 to about 8 carbon atoms.

The titanium halides which constitute the second component of the catalyst system of the present invention are identified by the formula

$TiX_n$ wherein X is selected from chlorine, bromine and iodine, and $n$ varies from 2 to 4. The most desirably single transition metal halide for use in the catalyst system of the invention is titanium trichloride; however, other titanium compounds defined by the formula set forth above can also be effectively employed in the catalyst composition.

The oxygenated organic halide compounds which are employed as the third component of the catalyst system of the invention, and which function in combination with the other components of the catalyst system to increase the isotaxy of the polymers prepared by the use thereof, are those organic compounds which bear one or more halogen atoms activated by the presence of oxygen nearby in the molecule. These compounds include carbon, oxygen and halogen atoms arranged relative to each other as represented by the following general structures:

(1) 

(2) 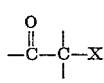

and (3) 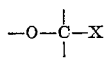

where X is a halogen atom.

Of the oxygenated organic halide compounds which may be employed in the catalyst system of the invention, those are preferred in which at least one halogen atom located in relation to an oxygen atom as required by the above formulas is chlorine, bromine or iodine. Examples of compounds which include the group and arrangement of atoms represented by structure (1) above are phosgene, benzoyl chloride, octanoyl chloride, propyl chloroformate, propanoyl bromide, isopropyl chloroformate, octanoyl bromide, benzoyl bromide, acetyl bromide, propyl bromoformate, butanoyl chloride, propanoyl iodide, m-bromobenzoyl chloride, trinitrobenzoyl bromide, butanedioyl dichloride, malonic dichloride, fumaric dichloride, itaconic dichloride, 2,5-dimethylbenzoyl chloride and hexahydrobenzoyl chloride.

Examples of compounds which include the arrangement of atoms represented by structure (2) above include α-chloroacetophenone, ethylbromacetate, chlorofumaric acid, chloromalonic acid, ethylchloropropionate, chloroacetone, α,ω-dichloroacetone, α-bromoisobutanoic acid, α-chloropropionic acid, chloroacetic acid, α-chlorocycloheptanone, ethyl-3-bromo-trans-2-butenoate and ethyl-2-chloro-2-butenoate.

Compounds which include structure (3) set forth above include chloromethyl methyl ether, chlorosodium formate, α,ω-dibromoethyl ether, trichloromethyl methyl ether, dichloromethyl maleate, bis(trichloromethyl)ether, α-chlorophenetole, chloromethyl acetate, p-amino-phenyl-chloroacetate, α,α,α',α'-tetrachlorodibenzyl ether, chloromethyl-o-nitrobenzoate, α-chlorofuran and 3-chloromethoxytoluene.

It will be noted that a single compound may include more than one of the arrangements of halogen and oxygen atoms prescribed by each of the several structural formuas set forth above. An example of this type of compound is bromoacetyl chloride

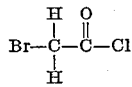

The oxygenated organic halides which are preferred for use in the catalyst system of the invention are those in which the oxygen and/or carbon atoms in structures (1), (2) and (3) above are bonded to either hydrocarbon radicals, or are hydrocarbon radicals substituted with or containing only oxygen and halogen atoms other than carbon and hydrogen. It is further preferred that the groups or radicals bonded to the oxygen and/or carbon atoms in the foregoing structures contain less than a total of about 12 carbon and oxygen atoms.

A wide variety of combinations of the several components of the catalyst system of the invention are, of course, possible and space permits the identification of only a relatively small portion of the total number of catalyst systems which can be employed. The following examples are presented merely as specific exemplifications of catalyst systems which are effective in carrying out the invention and are by no means intended to constitute an all-inclusive statement of the operative catalyst systems meeting the broad definition hereinbefore set forth. Triethylaluminum, titanium trichloride and benzoyl chloride; diethylaluminum hydride, titanium dichloride and α-chloroacetophenone; dipropylaluminum chloride, titanium tetrachloride and α,ω-bis(bromomethyl)ether; triisobutylaluminum, titanium tribromide and phosgene; diphenylaluminium hydride, titanium triiodide and chloromethyl methyl ether; triisopropylaluminum, titanium trichloride and butanedioyl dichloride; dihexylaluminum hydride, titanium tetrachloride and α-chloropropionic acid; triethylaluminum, titanium tribromide and α,α,α',α'-tetrachlorodibenzyl ether; diethylaluminum hydride, titanium tribromide and octanoyl chloride; dipropylaluminum chloride, titanium tetrabromide and ethyl bromoacetate; dinonylaluminum iodide, titanium trichloride and chlorosodium formate; didodecylaluminum bromide, titanium tribromide and propyl chloroformate; tridecylaluminum, titanium tetrachloride and chlorofumaric acid; tricyclohexylaluminum, titanium dibromide and trichloromethyl methyl ether; tribenzylaluminum, titanium tetraiodide and propyl chloroformate; tri(methylcyclopentyl)aluminum, titanium diiodide and chloromalonic acid; trieicosylaluminum, titanium trichloride and bis(trichloromethyl)ether; dicyclobutylaluminum hydride, titanium tribromide and octanoyl bromide; triphenylaluminum, titanium triiodide and ethyl chloropropionate; trioctadecylaluminum, titanium tetrachloride and α-chlorophenetole; tricyclobutylaluminum, titanium tetrabromide and benzoyl bromide; diisobutylaluminum hydride, titanium dichloride and chloroacetone; diphenylaluminum chloride, titanium dichloride and chloromethyl acetate; triethylaluminum, titanium tetraiodide and 2,5-dimethylbenzoyl chloride; triisopropylaluminum, titanium dibromide and α-chlorocycloheptanone; didodecylaluminum bromide, titanium trichloride and p-aminophenyl-chloroacetate; triphenylaluminum, titanium tribromide and chloromethyl-o-nitrobenzoate; dipropylaluminum chloride, titanium trichloride and fumaric dichloride; diethylaluminum hydride, titanium diiodide and α-chlorofuran.

The preferred catalyst systems for use in practicing the process of the invention, and particularly, for employment in the polymerization of propylene, are those which include the preferred oxygenated organic halide compounds described above when used in combination with triethylaluminum and titanium trichloride.

The monomers which are polymerized through the use of the catalysts of this invention are defined broadly as polymerizable, ethylenically unsaturated hydrocarbon monomers or, differently described, as vinyl hydrocarbons. A preferred class of these compounds is the aliphatic 1-olefins, such as, for example, ethylene, propene, 1-butene, 1-hexene, 1-octene and the like. Internal olefins and branched chain olefins can also be polymerized, such as, 2-pentene and isobutylene. In addition, cyclic olefins, such as, cyclopentene and cyclohexene can also be polymerized. The polymerizable ethylenically unsaturated monomers also include the aryl olefins, for example, styrene and the alkyl substituted styrenes. The alkyl substituted ethylenes can also be employed, such as, 2-methyl butene-1, 4-methyl pentene-1 and the like. Polyolefins in which double bonds are in either the conjugated or non-conjugated positions can also be employed. These include, for example, 1,5-hexadiene, 1,4-pentadiene, 1,4-octadiene, isoprene, 2-phenylbutadiene, and the like. It is also within the scope of the invention to polymerize mixtures of two or more of any of the monomers of the types previously set forth to produce the corresponding copolymers.

The catalyst systems of this invention are particularly valuable for their effect on the isotactic content of the resulting polymer. Thus, these catalyst systems provide polypropylene having a very high isotactic content, usually above 80 percent and frequently higher than 90 percent. The degree of isotaxy in the polymer is dependent, to a substantial extent, on the relative amounts of the organo-aluminum compound and the oxygenated organic halogen compound which are employed. The mole ratio of the oxygenated organic halogen compound to the aluminum compound employed in a particular catalyst system of the invention may vary somewhat, depending upon the particular oxygenated organic halogen compound utilized, but usually the mole ratio of the oxygenated organic halogen compound to the trialkylaluminum compound used in a preferred catalyst system will be from about 0.1 to about 5. Many of the oxygenated organic halogen compounds function best when used in a mole ratio of from about 0.2 mole to about 1 mole per mole of the trialkylaluminum compound.

The amount of the titanium compound employed in the catalyst systems can also be defined relative to the aluminum compound, i.e., the mole ratio of the titanium compound to the alkylaluminum compound varies from about 0.15 to about 1.0 and is preferably from about 0.2 to about 0.5.

Use of oxygenated organic halide compounds in the catalyst systems of the invention tends to decrease the activity otherwise exhibited by the basic two-component Ziegler-Natta system. As already pointed out, the amount of the modifier which is used in the system must be limited so that this decreased activity does not occur to an extent that is undesirable. All other things being considered, it certainly must be limited so that the catalyst activity is not destroyed. The activity of the catalyst can be noted by the rate at which a particular monomer is polymerized and a comparison of such rate with the rate which prevails where the organo-aluminum compound and titanium halide are utilized without the inclusion in the catalyst system of oxygenated organic halide compounds. Decreased catalyst activity, which results in a decreased rate of reaction, can be compensated for by a change in several reaction variables, such as by increasing the amount of catalyst, increasing the temperature, or increasing the pressure. Reaction variables such as pressure, temperature and time of reaction will be discussed in greater detail hereinafter.

In preparing the catalyst of this invention, the three components hereinbefore described are employed by initially combining the organo-aluminum compound and the oxygenated organic halide compound prior to the addition to the system of the titanium halide. This has been found to be a critical order of addition where an improvement in the isotactic content of the polymer produced is the major object of the catalyst usage.

The polymerization reaction is preferably carried out in the presence of an inert hydrocarbon diluent or mixture of inert hydrocarbons which can be paraffin, cycloparaffin or aromatic hydrocarbons. In this regard, the diluent can be selected from such compounds as pentane, hexane, heptane, isooctane, cyclohexane, methylcyclopentane, benzene, toluene and the like.

The catalyst components are brought together in the absence of air and moisture in the inert hydrocarbon diluent with the organo-aluminum compound and the oxygenated organic halide compound first introduced to the hydrocarbon diluent. The titanium halide compound is then added to the hydrocarbon diluent. The monomer or mixture of monomers to be polymerized is then introduced at an appropriate pressure to the polymerization vessel and the polymerization carried out over a period of time and temperature which is largely determined by the particular type of polymer to be polymerized and the catalyst system in use. In general, the polymerization reaction is carried out at as low a temperature as is feasible, usually between 0° C. and 150° C. In most instances, the temperature may best be maintained within the range of from about 25° C. to about 100° C.

The reaction pressure is that pressure which is required to maintain the inert diluent in a liquid state under the prevailing reaction conditions. Pressure can vary widely from slightly below atmospheric up to several thousand pounds per square inch, but usually is between atmospheric and about 200 p.s.i.g. While high pressures are not required in order to obtain the reaction, they will have a desirable effect on the reaction rate and, in some instances, on the polymer quality.

The time required to carry out the polymerization reaction is dependent upon a number of variables, including the particular monomer employed, the catalyst system, the relative proportion of the monomer and the catalyst, the reaction temperature, etc. Broadly, the reaction time can vary from about as low as a few minutes, for example, two minutes, to as high as 100 hours. Generally, however, in a batch process, the reaction is carried out over a period of from about 4 to about 24 hours. The polymerization process can be operated, of course, as either a batch reaction or can be carried out in a continuous process.

Recovery of the polymer from the polymerization reaction product is effected in accordance with conventional procedures.

The following examples are presented in illustration of the invention, but are not to be considered as limiting the scope of the invention to the precise reaction conditions or reactants employed in the examples.

EXAMPLES 1–23

Materials

Triethylaluminum
Titanium trichloride (aluminum activated)
Dry heptane (distilled over calcium hydride)
Polymerization grade propene
Various oxygenated organic halogen compounds
  (all commercially available)

Procedure

Dry heptane (40 to 100 ml.) was transferred under argon gas into thick-walled beverage bottles of about 200 ml. capacity. The required amounts of the oxygenated organic halogen compounds were then added to the dry heptane in the beverage bottles. In each case, solid and liquid halogen compounds were weighed into the polymerization bottles, the liquids being transferred with syringes. Where gaseous phosgene was used as the oxygenated organic halogen compound, the gas was measured and transferred to the beverage bottles using a large syringe.

Triethylaluminum was employed in the runs represented by Examples 1–16 as the organo-metallic compounds and was measured with a syringe and transferred to the polymerization bottles in a nitrogen flushed dry box. In some of the runs, upon mixing the trialkylaluminum with the oxygenated organic halogen compounds in the hydrocarbon diluent, a color formation was observed, indicating the formation of a complex as a result of the reaction between these materials. For example, with benzoyl chloride and α-chloroacetophenone, there was a transient deep orange red color which changed to a pale yellow color soon after the trialkylaluminum and halide compounds were combined in the inert diluent.

The transition metal halide was the last catalyst component introduced to the polymerization bottles, and in Examples 1–23, the transition metal halide employed was titanium trichloride. The latter compound was added in a dry box from preweighed vials.

A sufficient amount of dry heptane was used in the runs to give a 15 millimolar titanium compound concentration in the diluent. Similarly, except in four of the examples, a sufficient amount of triethylaluminum (30 millimolar) was used to give an aluminum compound/ titanium compound mole ratio of 2. Upon the addition to the polymerization bottles of the titanium trichloride, pink to brown to black suspensions were formed.

After all components of the catalyst system had been added to the polymerization bottles in the manner described, the bottles were capped with neoprene septa. Propene at 40 p.s.i.g. was then injected into the polymerization bottles (ca. 7 g. of propene per 100 ml. of heptane) and the bottles were then agitated overnight (16 hours) at a temperature of 75° C. The bottles were next brought to room temperature and vented. Except as noted in the data reported in Table I hereinafter, the propene was substantially all polymerized by the described procedure as evidenced by the absence of superatmospheric pressure within the polymerization bottles.

The catalyst as then deactivated by the addition of 20 ml. of isopropanol to the polymerization bottles, and the mixture was slurried in a blender with 200 ml. of water and 100 ml. of additional heptane. The slurry was transferred to a separatory funnel where it was mixed well with about 25 ml. of concentrated hydrochloric acid. The clear aqueous layer resulting was discarded, and the organic layer with the suspended polymer therein was washed twice more with water. After the organic layer was diluted with 100 ml. of isopropanol, the suspended polymer was separated by filtration. The soluble polymer was recovered by concentrating the filtrate on a steam bath. The insoluble polymer was slurried in a blender with 300 ml. of isopropanol and then recollected by filtration. After drying overnight in vacuo at 50° C. to 60° C., the insoluble polymer was extracted with refluxing heptane in a vapor jacketed extractor. As will be recognized by those skilled in the art, the insoluble polymer not extracted in the refluxing heptane is considered a measure of the isotaxy of the polymer.

The results of a number of polymerization runs which were carried out in the manner hereinbefore described are set forth in Table I. With the exceptions indicated, in each of the runs, 15 millimolar of titanium trichloride and 30 millimolar of triethylaluminum were introduced to the dry heptane diluent. The polymerization was carried out at 75° C. and propane was introduced at the beginning of each of the polymerization runs at a pressure of 40 p.s.i.g. The values of percent heptane insoluble polymer which are reported in Table I are based upon the total isolated soluble and insoluble polymer. The inherent viscosities were determined in Decalin at 135° C. at 1 gram per liter.

TABLE I.—POLYMERIZATION OF PROPENE IN THE PRESENCE OF OXYGENATED ORGANIC HALOGEN COMPOUNDS

| Example | Oxygenated Organic Halogen Compound | Mole Ratio Organic Halogen Compound to AlEt$_3$ | Percent Polymer Insoluble in Refluxing C$_7$ | Inherent Viscosity | Comments |
|---|---|---|---|---|---|
| 1 | Benzoyl chloride[1] | 0.5 | 86 | 6.23 | |
| 2 | do | 0.75 | 87 | 5.69 | |
| 3 | do | 1.0 | | | Very little polymer formed. |
| 4 | Octanoyl chloride | 0.5 | 83 | 3.50 | |
| 5 | do | 1.0 | | | Do. |
| 6 | Chloromethyl methyl ether | 0.5 | 83 | 3.50 | |
| 7 | do | 0.5 | 92 | | 86 percent propene conversion. |
| 8 | do | 0.75 | 93 | 5.45 | |
| 9 | do | 1.0 | | | Very little polymer formed. |
| 10 | α-Chloroacetophenone | 0.5 | 49 | | |
| 11 | do | 0.75 | 84 | 5.65 | |
| 12 | do | 1.0 | | | Do. |
| 13 | Phosgene | 0.25 | 49 | | |
| 14 | do | 0.5 | 82 | 3.69 | |
| 15 | do | 1.0 | | | Do. |
| 16 | Propyl chloroformate | 0.15 | 67 | | |
| 17 | do | 0.25 | 91 | 5.51 | |
| 18 | do | 0.50 | 95 | 5.51 | |
| 19 | do | 0.75 | | | Do. |
| 20 | Ethyl bromoacetate | 0.35 | 87 | 6.42 | |
| 21 | do | 0.5 | 93 | 7.12 | |
| 22 | Chloroacetone[1] | 1.0 | 87 | 9.03 | |
| 23 | None (control run) | | 58 | | |

[1] In the benzoyl chloride and chloroacetone runs, the mole ratio of Al/Ti was 4 instead of 2 as in the other runs.

From the data tabulated in Table I, it is clear that the addition in the proper amount of oxygenated organic halogen compounds of the type described to the basic Ziegler-Natta catalyst system yields polypropylene having a relatively high isotactic content, as evidenced by the high heptane insoluble portion of the polymer yielded. Example 23 is a control run in which no oxygenated organic compound was added to the triethylaluminum-titanium trichloride catalyst system. It will be perceived that the percent of heptane insoluble polymer formed in this polymerization run is considerably lower than the amount of the isotactic polymer produced when the catalyst system includes the oxygenated halide modifiers.

EXAMPLES 24–35

A series of propene polymerization runs were carried out employing various catalyst component ratios in a triethylaluminum-titanium trichloride-chloromethyl methyl ether catalyst system. The polymerization procedure employed the same conditions and steps described above with reference to Examples 1–23 except that the polymerization time utilized was 4 hours instead of 16 hours. The data obtained from the polymerization runs undertaken to study the effect of varying the catalyst component ratio are set forth in Table II.

It will be apparent in referring to Table II that the isotaxy of the polymer increases as the mole ratio of the oxygenated halide compound to the aluminum compound increases, until at a mole ratio of about 1:1 to 1, the total yield of polymer becomes so low as to render the polymerization of questionable economic feasibility. It will be noted in comparing Tables I and II, however, that by extending the polymerization time to about 12 hours (overnight) or longer, a relatively high degree of isotaxy can be achieved at mole ratios of the oxygenated halide compound to the aluminum compound of as low as 0.5 without an unacceptable decrease in the total yield of polymer.

TABLE II.—POLYMERIZATION STUDIES USING THE CATALYST SYSTEM ATE:ClCH₂OCH₃:TiCl₃

| Example | AlEt₃ mmole | ClCH₂OCH₃ mmole | TiCl₃ mmole | Mole Ratio Cl:Al | Percent C₃ converted to insoluble¹ polymer | Isotactic² Index | Percent yield of isotactic polymer | Inherent Viscosity |
|---|---|---|---|---|---|---|---|---|
| 24 | 2.98 | 1.00 | 1.49 | 0.35 | 98.5 | 66.0 | 65.0 | 2.42 |
| 25 | 2.98 | 1.00 | 1.49 | 0.35 | 98.5 | 65.4 | 64.3 | 2.41 |
| 26 | 2.98 | 1.49 | 1.46 | 0.50 | 100.0 | 69.9 | 69.9 | 1.99 |
| 27 | 2.98 | 1.49 | 1.96 | 0.50 | 95.4 | 67.7 | 64.6 | 2.19 |
| 28 | 2.98 | 1.94 | 1.46 | 0.65 | 98.3 | 72.5 | 71.3 | 2.06 |
| 29 | 2.98 | 1.94 | 1.46 | 0.65 | 97.0 | 71.8 | 69.6 | 2.25 |
| 30 | 3.06 | 2.45 | 1.53 | 0.80 | 98.4 | 84.1 | 82.8 | 2.83 |
| 31 | 3.06 | 2.45 | 1.53 | 0.80 | 93.8 | 82.9 | 77.8 | 2.70 |
| 32 | 2.98 | 2.73 | 1.42 | 0.95 | 90.8 | 92.6 | 84.1 | 3.91 |
| 33 | 2.98 | 2.73 | 1.42 | 0.95 | 93.4 | 92.4 | 86.1 | 4.13 |
| 34 | 2.98 | 3.28 | 1.42 | 1.10 | (³) | 92.7 | (³) | |
| 35 | 2.98 | 3.28 | 1.42 | 1.10 | (³) | 93.5 | (³) | |

¹ The insoluble polymer here referred to is an initial precipitate isolated in the work up of the polymer product and includes all of the isotactic fraction plus a portion of the atactic fraction.
² The isotactic index is the percent of the insoluble polymer not extracted by refluxing n-heptane.
³ Very low.

EXAMPLES 35–40

Studies were made to determine whether the order of addition or combination of the several catalyst components to each other was critical to the practice of the invention insofar as the desired result of substantial improvement in the isotactic content of the polymer produced by the catalytic action might be concerned. More particularly, in order to determine whether the transition metal halide compound and the organic oxygenated halide compound might be effectively combined in the inert hydrocarbon diluent prior to the addition of the alkylaluminum compound, several polymerization runs were carried out in which the transition metal halide and oxygenated halide were placed in the inert diluent and permitted an opportunity to react with each other prior to the addition thereto of the alkylaluminum compound. In these polymerization runs, a group of propene polymerizations were conducted in which benzoyl chloride was employed as the third component in a triethylaluminum-titanium trichloride catalyst system. The polymerizations were carried out in septum capped bottles following the procedure described above relative to Examples 1–16. However, order of addition of the catalysts was changed so that the titanium chloride and benzoyl chloride were initially added to 100 ml. of the dry heptane in the absence of air and moisture, the polymerization bottles capped and a period of time allowed to elapse prior to the addition of the triethylaluminum catalyst component. In the case of half of the runs, the polymerization bottles were agitated for 18 hours at 75° C. prior to the addition of the triethylaluminum. The other half of the bottles were allowed to stand quiescently at room temperature for a period of 18 hours.

After the 18 hour period, one mole of the triethylaluminum was added to each of the polymerization bottles for each mole of titanium trichloride, and the catalyst mixture agitated for 2 hours at 75° C. The bottles were then again cooled and additional triethylaluminum was added. Propene at 40 p.s.i.g. was pressured into the bottles and the polymerization was conducted with agitation for a period of 18 hours at 75° C. Since, at the end of this time, no propene escaped when the bottles were vented, a conversion of propene to the polymerized form of at least 95 percent was assumed. The polypropylene was then isolated and its isotactic content determined as described in Examples 1–16 above. From the results set forth in Table III, it may be clearly seen that when the oxygenated halogen compound and the titanium trichloride catalyst are initially combined followed by subsequent addition of the triethylaluminum, the isotactic content of the polypropylene is not substantially increased over that which is obtained when the oxygenated halide compound is omitted from the system as represented by the results obtained in Example 16 in Table I above.

TABLE III

| | Example | | | | | |
|---|---|---|---|---|---|---|
| | 35 | 36 | 37 | 38¹ | 39¹ | 40¹ |
| Millimoles of Titanium Trichloride | 1.70 | 1.74 | 1.71 | 1.69 | 1.73 | 1.77 |
| Millimoles of Benzoyl Chloride | 1.14 | 1.74 | 2.56 | 1.13 | 1.74 | 2.66 |
| Millimoles of AlEt₃ added after 18-hour period | 1.70 | 1.74 | 1.71 | 1.69 | 1.73 | 1.77 |
| Millimoles of AlEt₃ added 2 hours after first addition | 6.80 | 6.80 | 6.80 | 6.80 | 6.80 | 6.80 |
| Mole Ratio Benzoyl Chloride to AlEt₃ | 0.13 | 0.22 | 0.30 | 0.13 | 0.22 | 0.31 |
| Mole Ratio AlEt₃ to Titanium Trichloride | 5.00 | 4.90 | 5.00 | 5.03 | 4.90 | 4.80 |
| Weight of Propylene Added (grams) | 7.50 | 6.50 | 7.10 | 7.10 | 7.40 | 7.40 |
| Percent Yield of Isotactic Polymer | 57.0 | 48.0 | 51.0 | 61.0 | 44.0 | 52.0 |
| Isotactic Index | 63.8 | 55.5 | 54.1 | 64.0 | 48.7 | 57.2 |

¹ In these runs, after addition of benzoyl chloride and TiCl₃ to the diluent, the mixture was agitated for 18 hours at 75° C. In Examples 35–37, the mixture was merely allowed to stand quiescently at room temperature for 18 hours.

It was thus concluded that the order in which the catalyst components of the invention are combined is critical to the stereo-regulating effect of the catalyst.

Although certain specific examples and embodiments of this invention have been hereinbefore described, the invention is not to be considered as limited to the precise reaction conditions and reactants cited as changes and modifications may be made therein which are within the spirit and scope of the invention as defined by the appended claims.

What is claimed is:
1. A catalyst composition comprising:
   (a) a titanium halide of the formula $TiX_n$ in which X is a halogen selected from the group consisting of chlorine, bromine and iodine and $n$ varies from 2 to 4;
   (b) an oxygenated organic halide compound selected from the group consisting of compounds including at least one of the arrangements of atoms represented by the formulas

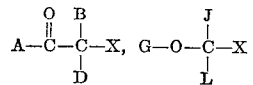

where X is a halogen having an atomic number of at least 17; A is aryl, alkoxy, hydroxy, alkyl or halogenated alkyl; B is hydrogen or alkyl; D is hydrogen, halogenated carboxylic acid, carboxylic acid or alkyl; G is alkyl, halogenated alkyl or aryl; J is hydrogen or halogen; L is hydrogen, halogen, alkyl or aryl; and (c) an aluminum compound having the formula $$AlR_nX_{3-n}$$

wherein R is a hydrocarbon radical, X is selected from hydrogen and halogen selected from the group consisting of chlorine, bromine and iodine, and $n$ varies from 2 to 3.

2. A catalyst composition as claimed in claim 1 wherein R is an alkyl group.

3. A catalyst composition as claimed in claim 2 wherein said aluminum compound is a trialkylaluminum compound.

4. A catalyst composition as claimed in claim 3 wherein said titanium halide in titanium trichloride.

5. A catalyst composition comprising:
(a) titanium trichloride;
(b) triethylaluminum; and
(c) an oxygenated organic halide compound selected from the group consisting of compounds including at least one of the arrangements of atoms represented by the formulas

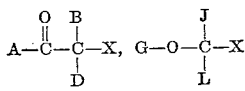

where X is a halogen having an atomic number of at least 17; A is aryl, alkoxy, hydroxy, alkyl or halogenated alkyl; B is hydrogen or alkyl; D is hydrogen, halogenated carboxylic acid, carboxylic acid or alkyl; G is alkyl, halogenated alkyl or aryl; J is hydrogen or halogen; L is hydrogen, halogen, alkyl or aryl; and wherein the mole ratio of the oxygenated organic halide compound to the triethylaluminum varies from about 0.1 to about 5; and wherein the mole ratio of titanium trichloride to the triethylaluminum varies about 0.15 to about 1.

6. A catalyst composition as claimed in claim 5 wherein the mole ratio of said oxygenated organic halide compound to triethylaluminum varies from about 0.2 to about 1.

7. A catalyst composition as claimed in claim 6 wherein the mole ratio of titanium trichloride to triethylaluminum varies from about 0.2 to about 0.5.

8. A catalyst composition comprising:
(a) titanium trichloride;
(b) chloromethyl methyl ether; and
(c) triethylaluminum;
wherein the mole ration of the α-chloroacetophenone to varies from about 0.2 to about 1.0.

9. A catalyst composition comprising:
(a) titanium trichloride;
(b) α-chloroacetophenone; and
(c) triethylaluminum;
wherein the mole ratio of the α- chloroacetophenone to triethylaluminum varies from about 0.5 to about 1.

10. A catalyst composition comprising:
(a) titanium trichloride;
(b) phosgene; and
(c) triethylaluminum;
wherein the mole ration of the phosgene to triethlyaluminum varies from about 0.2 to about 1.

11. A catalyst composition comprising:
(a) titanium trichloride;
(b) propylchloroformate; and
(c) triethylaluminum;
wherein the mole ration of the propylchloroformate to triethylaluminum varies from about 0.2 to about 1.0.

12. A catalyst composition comprising:
(a) titanium trichloride;
(b) ethylbromoacetate; and
(c) thiethylaluminum;
wherein the mole ratio of the ethylbromoacetate to triethylaluminum varies from about 0.2 to about 1.0.

13. A polymerization process comprising contacting under polymerization conditions an ethylenically unsaturated monomer selected from the group consisting of mono- and di-olefin hydrocarbon monomers, with a catalyst comprising:
(a) a titanium halide of the formula $TiX_n$ in which X is a halogen selected from the group consisting of chlorine, bromine and iodine and $n$ varies from 2 to 4;
(b) an oxygenated organic halide compound selected from the group consisting of compounds including at least one of the arrangements of atoms represented by the formulas

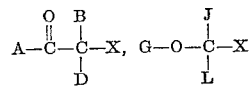

where X is a halogen having an atomic number of at least 17; A is aryl, alkoxy, hydroxy, alkyl or halogenated alkyl; B is hydrogen or alkyl; D is hydrogen, halogenated carboxylic acid, carboxylic acid or alkyl; G is alkyl, halogenated alkyl or aryl; J is hydrogen or halogen; L is hydrogen, halogen, alkyl or aryl; and
(c) an aluminum compound having the formula $$AlR_nX_{3-n}$$

wherein R is a hydrocarbon radical, X is selected from hydrogen and halogen selected from the group consisting of chlorine, bromine and iodine, and $n$ varies from 2 to 3; and recovering the polymer product.

14. A polymerization process which comprises contacting an ethylenically unsaturated monomer selected from the group consisting of mono- and di-olefin hydrocarbon monomers, with a catalyst comprising:
(a) a titanium halide of the formula $TiX_n$ in which X is a halogen selected from the group consisting of chlorine, bromine and iodine and $n$ varies from 2 to 4;
(b) an oxygenated organic halide compound selected from the group consisting of compounds including at least one of the arrangements of atoms represented by the formulas

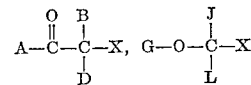

where X is a halogen having an atomic number of at least 17; A is aryl, alkoxy, hydroxy, alkyl or halogenated alkyl; B is hydrogen or alkyl; D is hydrogen, halogenated carboxylic acid, carboxylic acid or alkyl; G is alkyl, halogenated alkyl or aryl; J is hydrogen or halogen; L is hydrogen, halogen, alkyl or aryl; and
(c) triethylaluminum;
wherein the mole ratio of oxygenated organic halide compound to triethylaluminum varies from about 0.1 to about 5, and the mole ratio of transition metal halide to triethylaluminum varies from about 0.15 to about 1; and recovering the polymer product.

15. A polymerization process which comprises contacting an ethylenically unsaturated monomer selected from the group consisting of mono- and di-olefin hydrocarbon monomers, at a temperature of from about 0° C. to about 150° C. with a catalyst composition comprising:
(a) a titanium halide of the formula $TiX_n$ in which X is a halogen selected from the group consisting of chlorine, bromine and iodine and $n$ varies from 2 to 4;
(b) an oxygenated organic halide compound selected from the group consisting of compounds including at least one of the arrangements of atoms represented by the formulas

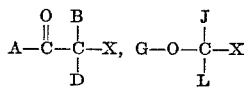

where X is a halogen having an atomic number of at least 17; A is aryl, alkoxy, hydroxy, alkyl or halogenated alkyl; B is hydrogen or alkyl; D is hydrogen, halogenated carboxylic acid, carboxylic acid or alkyl; G is alkyl, halogenated alkyl or aryl; J is hydrogen or halogen; L is hydrogen, halogen, alkyl or aryl; and
(c) triethylaluminum;
wherein the mole ratio of oxygenated organic halide compound to triethylaluminum varies from about 0.1 to about 5, and the mole ratio of transition metal halide to the triethylaluminum varies from about 0.15 to about 1; and recovering the polymer product.

16. A polymerization process which comprises:
(a) contacting an ethylenically unsaturated monomer selected from the group consisting of mono- and di-olefin hydrocarbon monomers, at a temperature of from about 0° C. to about 150° C. and a pressure from about 15 p.s.i.g. to about 200 p.s.i.g. with a catalyst composition comprising:
    (1) titanium trichloride; and in a mole ratio of from about 0.1 to about 5, respectively,
    (2) trietheylaluminum; and
    (3) an oxygenated organic halide compound selected from the group consisting of compounds including at least one of the arrangements of atoms represented by the formulas

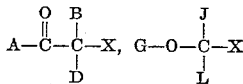

where X is a halogen having an atomic number of at least 17; A is aryl, alkoxy, hydroxy, alkyl or halogenated alkyl; B is hydrogen or alkyl; D is hydrogen, halogenated carboxylic acid, carboxylic acid or alkyl; G is alkyl, halogenated alkyl or aryl; J is hydrogen or halogen; L is hydrogen, halogen, alkyl or aryl; and where the mole ratio of titanium trichloride to the triethylaluminum reactant is from about 0.15 to about 1; and
(b) recovering the polymer product.

17. A process for polymerizing propene comprising:
(a) contacting propene at a temperature of from about 0° C. to about 150° C. and a pressure of from about 15 p.s.i.g. to about 200 p.s.i.g. with a catalyst composition comprising:
    (1) titanium trichloride;
    (2) molar quantity of triethylaluminum which is from about 1 to about 6 times the molar quantity of titanium trichloride; and
    (3) a molar quantity of chloromethyl methyl ether which is from about 0.2 to about 1.0 times the molar quantity of triethylaluminum; and
(b) recovering the polypropylene product.

18. A process for polymerizing propene comprising:
(a) contacting propene at a temperature of from about 0° C. to about 150° C. and a pressure of from about 15 p.s.i.g. to about 200 p.s.i.g. with a catalyst comprising:
    (1) titanium trichloride;
    (2) a molar quantity of triethylaluminum which is from about 1 to about 6 times the molar quantity of titanium trichloride; and
    (3) a molar quantity of α-chloroacetophenone which is from about 0.5 to about 1 times the molar quantity of triethylaluminum; and
(b) recovering the polypropylene product.

19. A process for polymerizing propene comprising:
(a) contacting propene at a temperature of from about 0° C. to about 150° C. and a pressure of from about 15 p.s.i.g. to about 200 p.s.i.g. with a catalyst composition comprising:
    (1) titanium trichloride;
    (2) a molar quantity of triethylaluminum which is from about 1 to about 6 times the molar quantity of titanium trichloride; and
    (3) a molar quantity of phosgene which is from about 0.2 to about 1 times the molar quantity of triethylaluminum; and
(b) recovering the polypropylene product.

20. A process for polymerizing propene comprising:
(a) contacting propene at a temperature of from about 0° C. to about 150° C. and a pressure of from about 15 p.s.i.g. to about 200 p.s.i.g. with a catalyst composition comprising:
    (1) titanium trichloride;
    (2) a molar quantity of triethylaluminum which is from about 1 to about 6 times the molar quantity of titanium trichloride; and
    (3) a molar quantity of propylchloroformate which is from about 0.2 to about 1 times the molar quantity of triethylaluminum; and
(b) recovering the polypropylene product.

21. A process for polymerizing propene comprising:
(a) contacting propene at a temperature of from about 0° C. to about 150° C. and a pressure of from about 15 p.s.i.g. to about 200 p.s.i.g. with a catalyst composition comprising:
    (1) titanium trichloride;
    (2) a molar quantity of triethylaluminum which is from about 1 to about 6 times the molar quantity of titanium trichloride; and
    (3) a molar quantity of ethylbromoacetate which is from about 0.2 to about 1.0 times the molar quantity of triethylaluminum; and
(b) recovering the polypropylene product.

22. The method for preparing an olefin polymerization catalyst which comprises:
(a) combining an aluminum compound having the formula $AlR_nX_{3-n}$ where R is a hydrocarbon radical, X is selected from hydrogen and halogen selected from the group consisting of chlorine, bromine and iodine, and $n$ varies from 2 to 3 with an oxygenated organic halide compound selected from the group consisting of compounds including at least one of the arrangements of atoms represented by the formulas

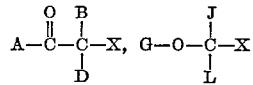

where X is a halogen having an atomic number of at least 17; A is aryl, alkoxy, hydroxy, alkyl or halogenated alkyl; B is hydrogen or alkyl; D is hydrogen, halogenated carboxylic acid, carboxylic acid or alkyl; G is alkyl, halogenated alkyl or aryl; J is hydrogen or halogen; L is hydrogen, halogen, alkyl or aryl; with the mole ratio of the oxygenated organic halide compound to the aluminum compound being from about 0.1 to about 5; then
(b) adding a titanium halide compound selected from the group consisting of chlorine, bromine and iodine and $n$ varies from 2 to 4 to the combination of said aluminum compound and said oxygenated organic halide compound.

References Cited

UNITED STATES PATENTS

| | | | |
|---|---|---|---|
| 3,317,499 | 5/1967 | Nakaguchi et al. | 260—93.7 |
| 3,236,824 | 2/1966 | Willjelm | 260—93.7 |

FOREIGN PATENTS

37/1592  5/1962  Japan.

JOSEPH L. SCHOFER, *Primary Examiner.*
JAMES A. SEIDLECK, *Examiner.*
M. B. KURTZMAN, *Assistant Examiner.*

UNITED STATES PATENT OFFICE
CERTIFICATE OF CORRECTION

Patent No. 3,380,981                           April 30, 1968

Donald B. Miller et al.

It is certified that error appears in the above identified patent and that said Letters Patent are hereby corrected as shown below:

Column 11, line 55, "ration of the alphachloroacetophenone to" should read -- ratio of the ether to the triethylaluminum --. Column 14, line 73, after "compound" insert -- of the formula $TiX_n$ in which X is a halogen --.

Signed and sealed this 9th day of September 1969.

(SEAL)
Attest:

Edward M. Fletcher, Jr.                      WILLIAM E. SCHUYLER, JR.
Attesting Officer                             Commissioner of Patents